Oct. 23, 1923.
G. W. LANGFORD
SNUBBER
Filed Dec. 5, 1919
1,471,560
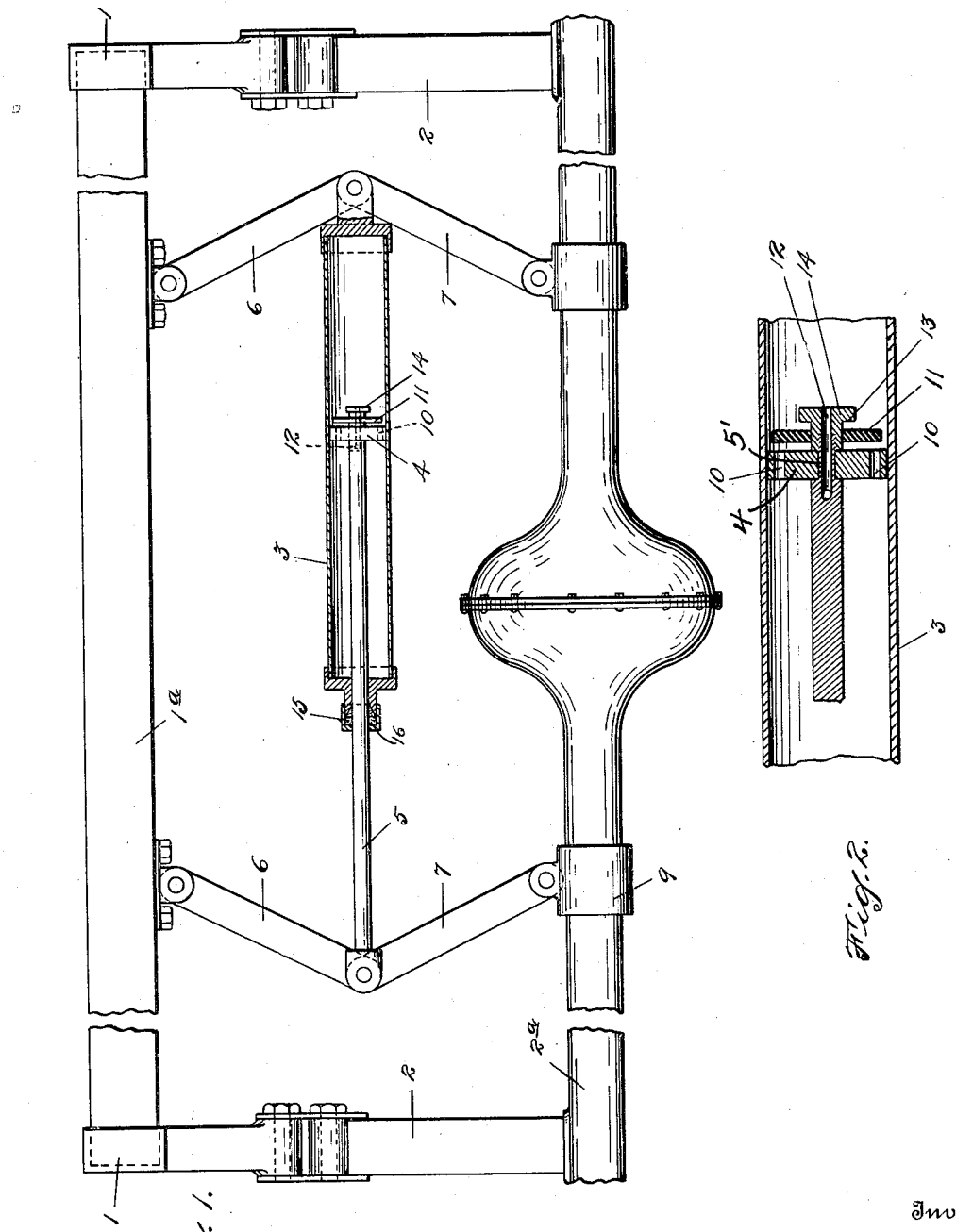
Inventor
George W. Langford
By Whittemore, Hulbert & Whittemore
Attorneys Patented Oct. 23, 1923.

1,471,560

UNITED STATES PATENT OFFICE.

GEORGE W. LANGFORD, OF ANN ARBOR, MICHIGAN.

SNUBBER.

Application filed December 5, 1919. Serial No. 342,748.

*To all whom it may concern:*

Be it known that I, GEORGE W. LANGFORD, a citizen of the United States of America, residing at Ann Arbor, in the county of Washtenaw and State of Michigan, have invented certain new and useful Improvements in Snubbers, of which the following is a specification, reference being had therein to the accompanying drawings.

The invention relates to snubbers and more particularly to snubbers for use on motor vehicles.

Among the objects of my invention is the provision of an efficient and simple construction of snubber which may be arranged upon the motor vehicle so as not to reduce the road clearance. Another object of my invention is to provide a snubber employing a cylinder and piston which will permit of a comparatively slow relative movement between the piston and the cylinder in one direction, while allowing a comparatively free relative movement between the piston and cylinder in the opposite direction.

Other objects of my invention will more fully hereinafter appear.

In the drawings:

Figure 1 is an elevation partly in section of a construction embodying the invention;

Figure 2 is a fragmentary longitudinal section through the snubber.

In the drawings, 1 designates the side sills of the frame of a motor vehicle, 2 designates springs secured to the side sills and adapted to be mounted upon the axle $2^a$ of the motor vehicle. The particular snubber shown in the drawings consists of a cylinder 3 and a piston 4 slidably engaging the cylinder. The piston 4 is provided with a rod 5 extending without the cylinder so adapted to be secured respectively to the frame of the motor vehicle and to the axle or a suitable part carried by the axle. Heretofore shock absorbers have been employed which consisted of a piston and a cylinder, but the arrangement has been objectionable since the shock absorber projected below the axle resulting in the reduction of road clearance.

In order to prevent the snubber from restricting the road clearance, it is so arranged in relation to the axle as not to project any material distance below, and preferably positioned to be entirely above the plane of the under side of the axle. In the particular embodiment of the invention herein illustrated, the cylinder 3 is arranged substantially horizontal and is connected at one end to toggle links 6 and 7, the link 6 being attached to the frame $1^a$, while the link 7 is attached to a suitable bracket 9 connected to the axle. The outer end of the piston rod 5 is attached in a similar manner to the frame and to the axle.

With the particular connection shown, the links 6 and 7 are so arranged that the pivot at their inner ends is outside the line passing through the pivots connecting the outer ends to the frame and axle at all times, thereby preventing, upon a movement of the frame toward the axle, the pivot at the inner ends of the toggle links either reaching or passing inwardly beyond the line passing through the pivots at the outer ends. This manner of connecting the piston and cylinder to the frame and axle is very desirable, since it permits a single piston in the cylinder to be employed for snubbing the rebound of both springs, while at the same time the arrangement will snub the rebound of but one spring when the action of one spring only is brought into play, as, for instance, by the wheel of one end of the axle when striking a projection in the roadway. However, the construction is such as to permit of an independent snubber for each spring, if it is desired.

In the particular arrangment shown, it will be noticed that upon a relative movement of the axle and frame towards one another, the piston moves outwardly within the cylinder. For the purpose of permitting a comparatively free movement of the frame and axle towards one another, the piston 4 is provided with a plurality of apertures 10 therethrough which are controlled by a suitable disc valve 11, which when the piston moves outwardly within the cylinder permits the ports to be uncovered allowing free passage of the liquid or fluid within the cylinder from one side of the piston to the other, but when the piston is moved inwardly within the cylinder upon the relative separation of the frame and axle, the valve 11 closes the ports thereby causing the compression of the liquid or fluid within the cylinder, retarding the movement of the frame and axle away from one another. To permit of the restricted flow of oil or other liquid, or air or other fluid, from one side of the piston to the other, there is a passage way 12 extending substantially axially through the inner end of the piston rod 5 and communicating with the spaces of the cylinder 3 upon opposite sides of the piston 4.

In order to avoid any bounding or rattling of the valve 11, this member is preferably formed of a suitable fibre which deadens the impact of the valve 11 against the piston proper 4, or against the head 13 of the shouldered nut 14 upon which the disc 11 is arranged for a limited travel. This nut is secured to the reduced end 5' of the piston rod 5 by any suitable method as by threadedly engaging the same. The piston 4 is sleeved upon the reduced end 5' and is held from longitudinal movement by the inner end of the nut 14 engaging its outer face.

The end of the cylinder 3 through which the piston rod 5 extends is provided with a stuffing box gland 15 containing suitable packing 16, and in order to prevent the pressure created in the cylinder upon the compression stroke of the piston from being transmitted directly to the packing, I arrange the stuffing box at the end of the cylinder opposite from that towards which the piston moves upon its compression stroke. The gland 15 is preferably threaded upon the adjacent end closure of the cylinder 3.

In operation, upon movement of either of the springs 2 toward their respective sills 1, the inner ends of the links 6 and 7 of the toggle levers will move outwardly, thereby moving the piston 4 outwardly relative to the cylinder 3. The washer 11 upon the piston rod 5 moves away from the piston and opens the ports 10 to permit of flow of the liquid or fluid in the cylinder therethrough. Upon movement of the springs 2 in the opposite direction relative to the cylinder 3 the washer 11 closes the ports 10 so that the liquid or fluid in the cylinder can not pass therethrough. The passage way 10 in the inner end of the piston rod 5 permits of a comparatively small flow of liquid or fluid so that the piston will slowly return to its normal position and permit of the springs returning slowly to their normal position, whereby the snubbing effect is obtained.

I have shown and described one very desirable form of my invention, but I do not desire to limit my protection to the particular construction illustrated, as my invention is capable of various modifications.

What I claim as my invention is:

1. In a vehicle, the combination with a frame and an axle, of a horizontal cylinder disposed between said frame and said axle and containing a liquid, a piston rod extending into said cylinder, toggle levers connected to said frame and to said axle, said levers being also connected respectively to said cylinder and to said piston rod, a piston within said cylinder and carried by said rod, said piston having ports therethrough, said piston rod being provided with means for permitting a restricted flow of liquid from one side of said piston to the other, and slidable means upon said piston rod for closing the ports in said piston.

2. In a vehicle, the combination with a frame and an axle, of a snubber between said frame and axle comprising a horizontal cylinder extending transversely of said frame and disposed in substantially the vertical plane of the axle, a piston slidably engaging said cylinder and having a rod extending through said cylinder, and toggle lever connections between said cylinder and said frame and axle and between said piston rod and said frame and axle.

3. In a vehicle, the combination with a frame and an axle, of a snubber between said frame and axle comprising a horizontal cylinder extending transversely of said frame, a piston slidably engaging said cylinder and having a rod extending through said cylinder, and toggle levers pivotally connected to said axle adjacent to the opposite ends thereof and to said frame, said levers being also pivotally connected respectively to said cylinder and to said piston rod.

In testimony whereof I affix my signature.

GEORGE W. LANGFORD